United States Patent
Nguyen et al.

(10) Patent No.: US 12,190,072 B2
(45) Date of Patent: *Jan. 7, 2025

(54) PROFILE-BASED NATURAL LANGUAGE MESSAGE GENERATION AND SELECTION

(71) Applicant: Capital One Services, LLC, McLean, VA (US)

(72) Inventors: Huong Nguyen, San Francisco, CA (US); Isha Chaturvedi, Mountain View, CA (US); Kalanand Mishra, Mountain View, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,335

(22) Filed: Jun. 22, 2023

(65) Prior Publication Data

US 2023/0334264 A1 Oct. 19, 2023

Related U.S. Application Data

(63) Continuation of application No. 17/699,973, filed on Mar. 21, 2022, now Pat. No. 11,704,503, which is a continuation of application No. 17/142,845, filed on Jan. 6, 2021, now Pat. No. 11,314,945.

(51) Int. Cl.
*G06F 40/42* (2020.01)
*H04L 51/48* (2022.01)
*H04L 67/306* (2022.01)

(52) U.S. Cl.
CPC .............. *G06F 40/42* (2020.01); *H04L 51/48* (2022.05); *H04L 67/306* (2013.01)

(58) Field of Classification Search
CPC ........ H04L 51/48; H04L 67/306; G06F 40/42
USPC .......................................................... 704/9
See application file for complete search history.

(56) References Cited

U.S. PATENT DOCUMENTS

| | | | |
|---|---|---|---|
| 11,314,945 B1 * | 4/2022 | Nguyen | G06F 40/42 |
| 11,704,503 B2 * | 7/2023 | Nguyen | H04L 51/48 704/9 |
| 2021/0264115 A1 * | 8/2021 | Wang | G06F 16/26 |

* cited by examiner

*Primary Examiner* — Alan S Chou
(74) *Attorney, Agent, or Firm* — Foley & Lardner LLP (57) ABSTRACT

In some embodiments, text for user consumption may be generated based on an intended user action category and a user profile. In some embodiments, an action category, a plurality of text seeds, and a profile comprising feature values may be obtained. Context values may be generated based on the feature values, and text generation models may be obtained based on the text seeds. In some embodiments, messages may be generated using the text generation models based on the action category and the context values. Weights associated with the messages may be determined, and a first text message of the messages may be sent to an address associated with the profile based on the weights. Based on a reaction value obtained in response to the first message, a first expected allocation value may be updated based on the reaction value.

20 Claims, 4 Drawing Sheets

PROFILE-BASED NATURAL LANGUAGE MESSAGE GENERATION AND SELECTION

CROSS-REFERENCE TO RELATED APPLICATION

This application is a continuation of U.S. patent application Ser. No. 17/699,973, filed Mar. 21, 2022, which is a continuation of U.S. patent application Ser. No. 17/142,845, filed Jan. 6, 2021. The content of the foregoing applications is incorporated herein in its entirety by reference.

FIELD

The invention relates to data processing, and more specifically to natural language processing.

BACKGROUND

Digital messaging systems such as text messaging, email, or social media messages are used to communicate important information to users. In many cases, the content of these messages may include reminders for future events, status changes, and possible actions that the user may take. Providing this content in meaningful ways increases the efficiency of information retention by the message recipient. Developing tools that increase the efficiency of information retention may also reduce the number of messages sent to the recipient and increase their receptiveness to future messages.

SUMMARY

Aspects of the invention relate to methods, apparatuses, media, and/or systems for natural language processing.

In some embodiments, an action category indicating a target user reaction may be obtained. A user category may be determined based on a set of feature values of a user profile for a user. A first text seed and a second text seed of the user category may be obtained. A first text generation model may be configured with a first set of neural network parameters corresponding to the first text seed, and a second text generation model may be configured with a second set of neural network parameters corresponding to the second text seed. A first message may be generated using the first text generation model (configured with the first set of neural network parameters or the first text seed), the action category, and the user category, and a second message may be generated using the second text generation model (configured with the second set of neural network parameters or the second text seed), the action category, and the user category. A first weight associated with the first message may be determined based on a first expected allocation value of the user profile and a count of previous messages associated with the first text seed. The first expected allocation value may be associated with the first text seed. A second weight associated with the second message may be determined based on a second expected allocation value of the user profile and a count of previous messages associated with the second text seed. The second expected allocation value may be associated with the second text seed. The first message may be sent to an electronic address, and the second message may not be sent, based on a comparison between the first weight and the second weight. A reaction value may be obtained from the user in response to the first message, where the reaction value indicates a user response with respect to the target user reaction. A determination of whether the reaction value satisfies a threshold based on the action category may be made. In response to a determination that the reaction value satisfies the threshold, the first expected allocation value may be updated. The updated first expected allocation value may be stored in persistent storage.

Some embodiments may include a system that performs operations to use natural language processing techniques to address the difficulty of generating messages that account for a message recipient's context in a systematic, verifiable, or unbiased way. These operations may include selecting action categories based on predicted allocation values, generating messages using a text generation model that accounts for user-specific data and the selected action categories, and intelligently selecting which message to send. By using an interpretable text generation model to generate messages, some embodiments may overcome possible biases of human-written messages and permit increased granularity when tailoring a message for a given message recipient. Furthermore, by selecting from a plurality of messages for distribution and recording user reactions to the distributed messages with respect to a target action, some embodiments may be used to detect shared features between messages that elicit a target action. The information provided by the analysis of these shared features may then be used for refined message generation or message selection operations.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Example Systems

Figure 1:
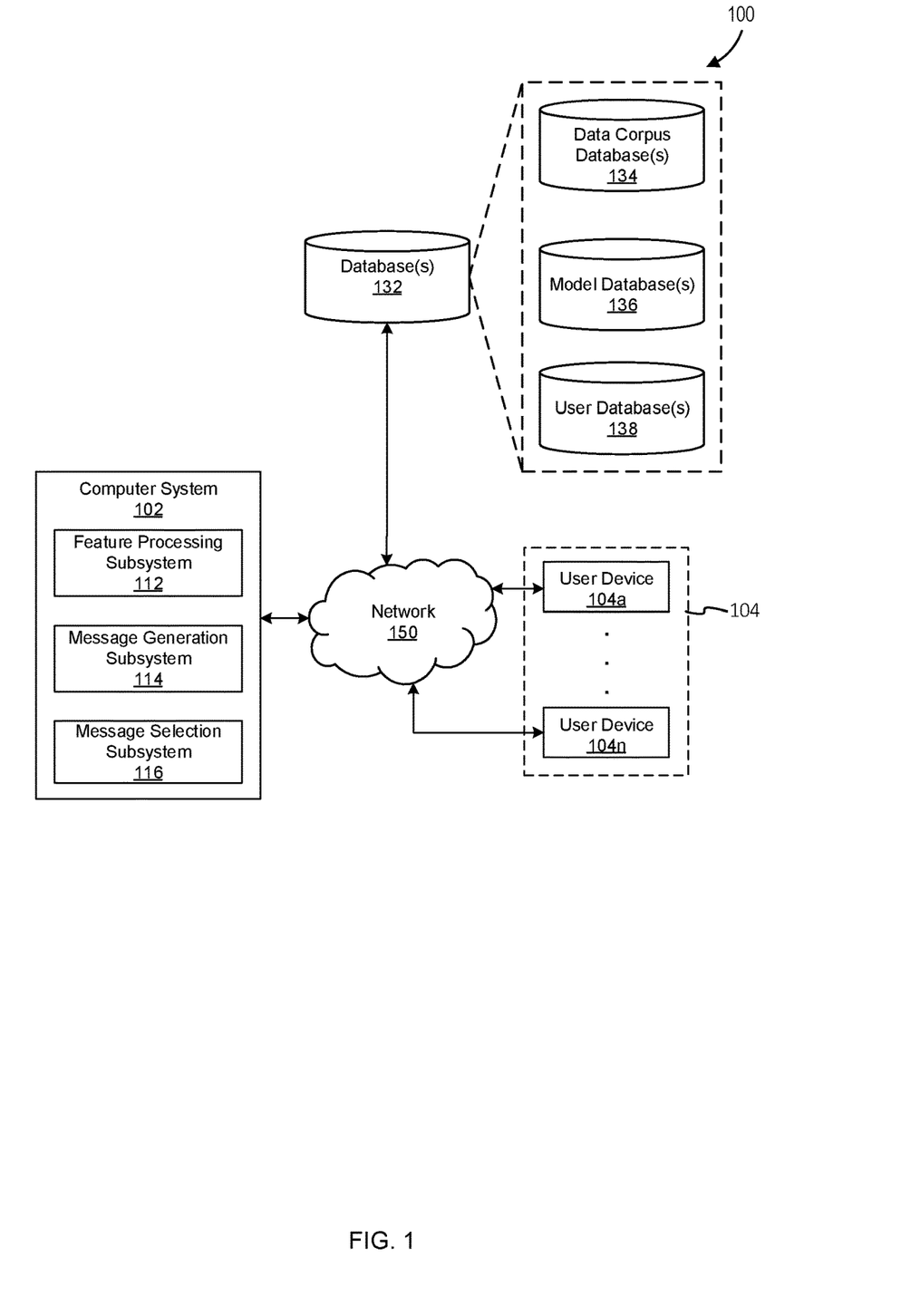
FIG. 1 shows a system for message generation based on user-specific features, in accordance with one or more embodiments.

FIG. 1 shows a system for message generation based on user-specific features, in accordance with one or more embodiments. As shown in FIG. 1, system 100 may include computer system 102, a set of user devices 104 including user devices 104a-104n, or other components. Computer system 102 may include a feature processing subsystem 112, message generation subsystem 114, message selection subsystem 116, and/or other components. Each user device of the set of user devices 104 may include any type of mobile terminal, fixed terminal, or other device. By way of example, a user device of the set of user devices 104 may include a desktop computer, a notebook computer, a tablet computer, a smartphone, a wearable device, or other user device. Users may, for instance, utilize one or more of the set of user devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of the computer system 102, those operations may, in some embodiments, be performed by components of the set of user devices 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, the system 100 may generate a set of natural language text messages. The set of natural language text messages may be generated based on one or more target actions (e.g., an intent of a message selected from a category of intents) and based on one or more values stored or otherwise associated with a user profile (e.g., a profile of a user account). For example, the system 100 may obtain an intent from a user interface and a set of user-specific values from a user account to determine a set of text seeds, which may include words, named entities, relationship categories, other n-grams, etc. The system 100 may then use a text generation model to generate one or more messages from the text seeds and select messages for use. In some embodiments, the system 100 may process different features of a user to categorize the user into one or more user category categories such as "student," "dental assistant," "painter").

As used in this disclosure, an n-gram may include a word, a sequence of words, a portion of a word (e.g., an incomplete word), etc. While a word may be treated as a set of characters delimited by white spaces and punctuation characters, a word may be differently-delimited in other languages. For example, a word may be defined as either a single character or a set of related characters. Additionally, as used in this disclosure, unless stated otherwise, the n-grams of a set of n-grams may have different character lengths, different numbers of words, different punctuation, different syllables, etc. with respect to each other. For example, a set of n-grams representing text seeds may include the following list of four n-grams: ["::", "rutabaga", "cabbage stew", "essence of cilantro"].

The system 100 may retrieve, compute, or otherwise determine a set of text generation parameters (e.g., machine learning parameters, text seeds, etc.) for use during text generation for the user's consumption. As discussed elsewhere in this disclosure, a set of text generation parameters may include text seeds for use in a message, where the text seeds may be retrieved based on an associated user category. For example, a text seed for a user labeled with the user category "streaming video enthusiast" may include the n-gram "rewatch." Some embodiments may also assign a subset of a set of text seeds for use, where different combinations of text seeds may be associated with different reward values. Alternatively, or in addition, a text seed for a user may be determined based on an action category. For example, a text seed for a selected action category "encourage IT hygiene" may include the text seed "MFA" or "verify your e-mail."

The system 100 may use one or more text generation models to generate one or more text messages based on the corresponding text generation parameters. For example, the system 100 may generate a first message using a first set of text seeds or other text generation parameters, where the first set of text seeds may include a first subset of text seeds associated with an action category and a second subset of text seeds associated with the user category. The system 100 may also generate a second message using a second set of text seeds or other text generation parameters, where the second set of text seeds may include the first subset of text seeds and a third subset of text seeds associated with the user category, where the second and third subsets of text seeds may be different from each other.

In some embodiments, the system 100 may select one or more of the generated messages for use and distribution to a message recipient. For example, the system 100 may assign a weight to each respective message of a plurality of generated messages, where the weight may indicate a likelihood that the message will be selected and sent to a user. In some embodiments, the weight may be associated with an expected allocation value (e.g., an expected reward weight) that represents the expectation a target user action will occur after a user receives the message. Alternatively, or in addition, the weight may be associated with an exploration value correlated with an exploration weight, where the exploration value increases the possibility of the system 100 selecting a new message or a message generated with a new set of text seeds or other associated text generation parameters. Some embodiments may balance the expected allocation value with the exploration value to determine a weight using a learning operation, such as a multi-armed bandit learning model, as described further below.

In some embodiments, the text generation model or message selection models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion. Additionally, as further described below, some models may include specific sets of neural network layers to perform different tasks, such as encoding n-grams into embedding vectors, decoding the embedding vectors into n-grams such as words or phrases, predicting missing or masked n-grams, etc.

Figure 2:
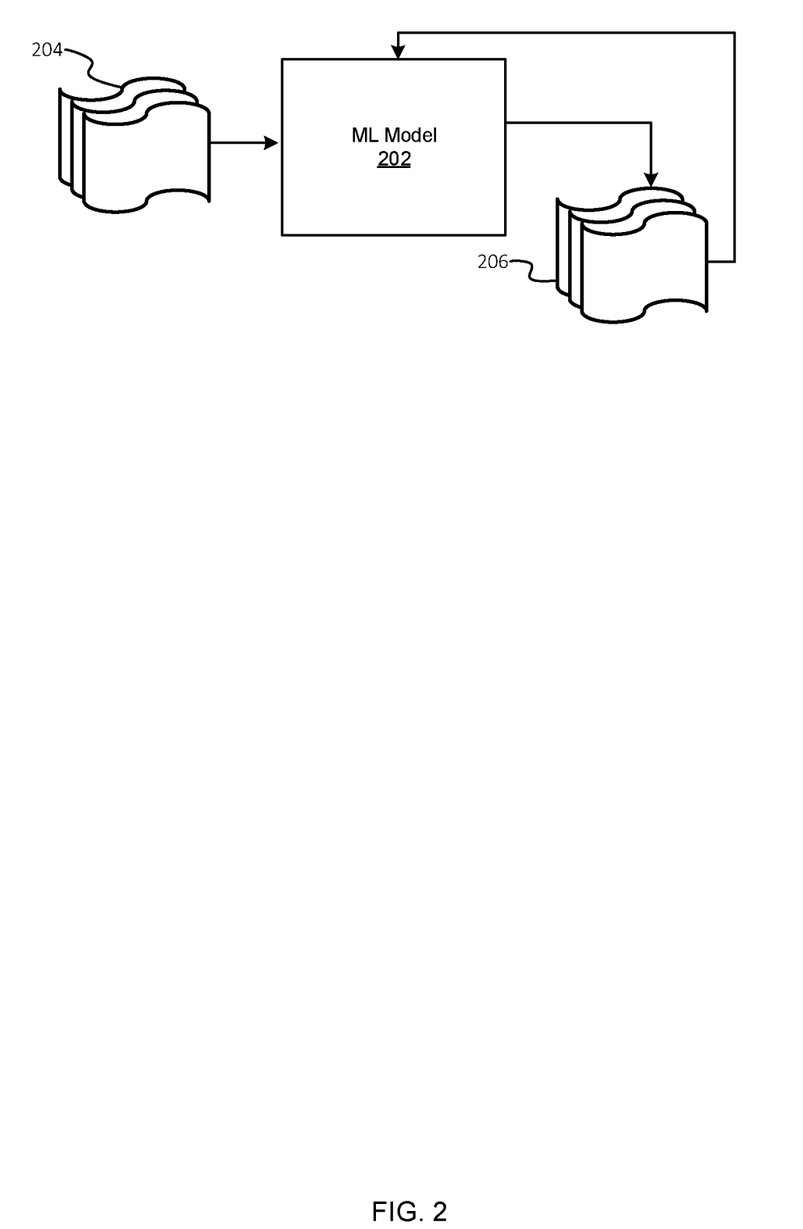
FIG. 2 shows a machine learning model configured to generate or select messages, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of the outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-116

In some embodiments, the feature processing subsystem 112 may use, at least in part, one or more datasets obtained from a user database(s) 138. The user database(s) 138 may include a population of user profiles, where each profile may include indicators of past user activity, such as a list of user profile changes, a credit history, an investment history, a financial transaction history, etc. Some embodiments may also retrieve demographic information, such as age, education history, etc. Alternatively, or in addition, some embodiments may be configured not to use one or more values of a user profile, such as classified or impermissible demographic data. For example, some embodiments may prevent the feature processing subsystem 112 from selecting features such as a user's indicated race, age, etc.

The feature processing subsystem 112 may include subroutines to select one or more subsets of features to identify which subsets of features are most likely to be relevant for message generation. Alternatively, or in addition, the feature processing subsystem 112 may be used to retrieve a selected set of features and processes them using a set of dimension reduction operations. For example, the feature processing subsystem 112 may normalize features and extract features using a set of dimension reduction operations. In some embodiments, the feature processing subsystem may determine one or more user categories for users based on the features of a user profile. As described elsewhere in this disclosure, some embodiments may perform a clustering operation to determine a set of clusters of vectors generated from the features, where each vector may represent a vectorized form of a set of features selected or extracted from a user profile or other record associated with a user. The corresponding user may then be assigned to a user category based on the cluster to which the vector is assigned.

The message generation subsystem 114 may generate a set of messages using a text generation model. The text generation model may be configured based on the output(s) of the feature processing subsystem 112. For example, the text generation model may be configured by being provided with text seeds, neural network parameters for a neural network model used to generate text, other text generation parameters, etc. Some embodiments may retrieve one or more of the text generation parameters from a model database(s) 136 based on the features associated with a user. For example, after a user is categorized as being of a first user category based on the features of the user's corresponding profile, the message generation subsystem 114 may retrieve a first set of text seeds and neural network layer parameters associated with the first user category from the model database(s) 136. In some embodiments, the message generation subsystem 114 may also retrieve a second set of text seeds and neural network layer parameters associated with an action category from the model database(s) 136.

In some embodiments, one or more of the model parameters stored in the model database(s) 136 may be determined during a training operation using data from a data corpus database(s) 134. The data corpus database(s) 134 may include one or more data corpora configured to store a plurality of documents. A document may include text documents, images or text data extracted from images, audio or text data extracted from the audio data, video or transcripts extracted from the video, etc. The sources of the data corpora may include a set of publicly available data repositories, such as a set of government databases or websites. Alternatively, or in addition, the sources of data corpora for an organization may be retrieved from internal documents, e-mail communication, SMS text messaging systems, text messages sent over a messaging platform, feedback from a customer survey, medical billing claims, internal training documents, etc.

In some embodiments, the documents stored in the data corpus database(s) 134 may be used to train a prediction model stored in the model database(s) 136. For example, some embodiments may train an encoder-decoder transformer neural network to determine a set of neural network parameters that may be used to generate messages based on an initial set of seed text. In some embodiments, the number of documents stored within the data corpus database(s) 134 may include 100 or more documents, 1,000 or more documents, 1,000,000 or more documents, etc. The data corpus database(s) 134 may also store datasets of other data associated with the documents that may be used to increase the accuracy and versatility of a text generation model, such as indication of which documents or parts of documents are part of a training set.

In some embodiments, the message selection subsystem 116 may determine weights for a message usable to determine which message of a plurality of messages should be sent to a user. Some embodiments may use an independent set of prediction models to determine the weights, where using the prediction model may include a model that balances message exploration with selecting a message based on an expected allocation value. As described further below, the expected allocation value for a message may indicate the likelihood that a user will perform one or more actions indicated by a target user reaction after receiving a message.

Some embodiments may determine an expected allocation value or its corresponding weight for a message based on the presence or order of text seeds or other text generation parameters used to generate the message. Some embodiments may update the parameters of a prediction for a user based on a record user's reaction value, which may include a positive reaction (e.g., clicking on a link provided to the user via the message) or a negative reaction (e.g., declining a request or not performing a requested action within an allotted time period).

As described elsewhere in this disclosure, the feature processing subsystem 112, message generation subsystem 114, or message selection subsystem 116 may include machine learning models, statistical models, and other prediction systems to determine a set of text to generate or select for a message. The machine learning models used in this disclosure or their associated prediction model parameters may be stored in model database(s) 136. For example, a set of machine learning models used in this disclosure may include recurrent neural networks, transformer models, point generation neural networks, or other models.

Figure 3:
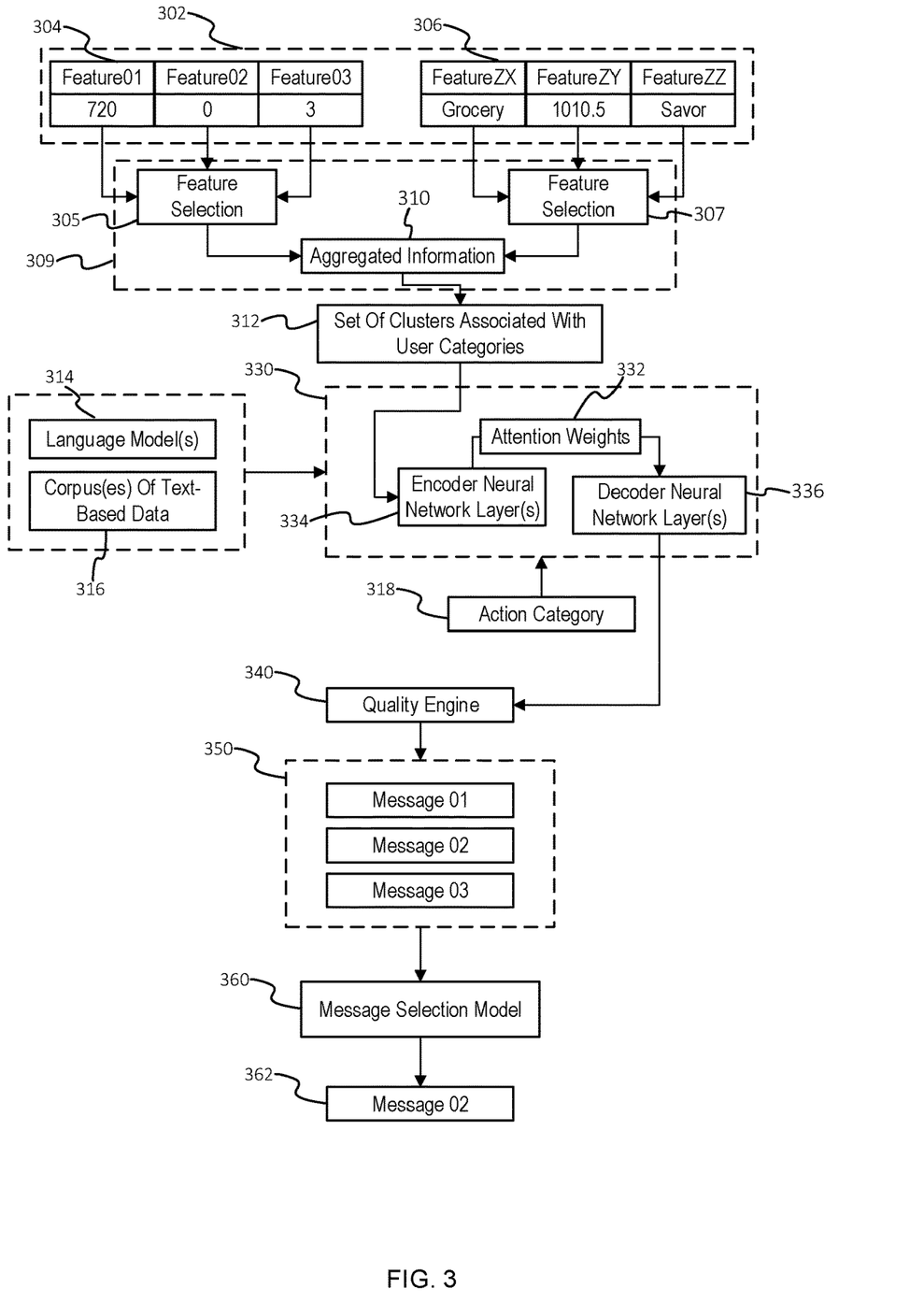
FIG. 3 shows a data architecture used to generate, select, or distribute messages, in accordance with one or more embodiments.

FIG. 3 shows a data architecture used to generate, select, or distribute messages, in accordance with one or more embodiments. The logic architecture 300 includes a target user profile that may be accessed to determine a set of feature values 302, where the set of feature values may include a first subset of feature values 304 and a second subset of feature values 306. One or more feature selection operations may be performed to obtain a selected set of features using a feature selection system 309. In some embodiments, the feature selection system 309 may include a plurality of feature selection modules, such as a first feature selection module 305, a second feature selection module 307. Additionally, the feature selection system 309 may include a module to collect selected features and produce a set of aggregated information 310. For example, the first feature selection module 305 may be used to select the first subset of feature values 304, and the second feature selection module 307 may be used to select the second subset of feature values 306. As shown by the set of feature values 302, a set of features may include various types of data such as numbers, strings, categories, Boolean values, etc. Some embodiments may collect the selected features to form the set of aggregated information 310.

In some embodiments, elements of the feature selection system 309 may be used to provide interpretability or reduce bias in model outputs, as further described below. For example, a first feature selection module 305 may be replaced or otherwise updated based on a selected model. Replacing or otherwise updating a feature selection module may change which specific features are selected, which may modify the way users are clustered or otherwise categorized, as further described below. Various other feature selection operations may be performed, such as those described by Arik et al. (Arik, S. O. and Pfister, T., 2019. Tabnet: Attentive interpretable tabular learning. arXiv preprint arXiv:1908.07442), which is incorporated herein by reference. For example, some embodiments may implement a Tabnet architecture similar to those described by Arik et al. to perform interpretable feature selection operations from a set of feature values or other context values associated with a user.

Some embodiments may use dimension reduction operations such as Latent Dirichlet Allocation (LDA) or principal component analysis (PCA) to reduce the dimensionality of aggregated data. For example, some embodiments may apply a PCA operation to reduce the dimensionality of a first set of features having 200 dimensions into an aggregated set of features having 20 dimensions. Alternatively, or in addition, some embodiments may apply a one hot encoding operation to categorical data in the selected set of features. For example, some embodiments may convert a first feature having the categorical value "happy" selected from the set of three possible categorical values '['happy', 'sad', 'resplendent']' into a set of three features. A first feature of the three features may correspond with the "happy" category, and the other two features of the three features may correspond with the "sad" and "resplendent" categories, where the first feature has a non-zero feature value, and where the other two features may have zero as their respective feature values.

As described above, some embodiments may select features using methods compatible with a tabular learning architecture. Some embodiments may use a regression model (e.g., linear regression, logistic regression, etc.) to select a set of features. For example, some embodiments may use a logistic regression algorithm to select a set of features based on which feature are associated with the greatest coefficients using the logistic regression algorithm, where the coefficients may indicate a feature importance. Alternatively, or in addition, some embodiments may use a decision tree model to select one or more features. For example, some embodiments may use a classification and regression tree (CART) fitted using a set of training data to select features of a user context. By using a regression algorithm or decision tree model to select features, some embodiments may provide feature selection operations that are interpretable but still robust to variations between users.

Alternatively, or in addition, some embodiments may use one or more neural network models to perform one or more feature selection operations, such as using a learnable mask to perform a soft selection of features. For example, some embodiments may use a vector representing the learnable mask, where a dot product of the vector and a second vector representing a set of features may be used as an output. In some embodiments, the values of the learnable mask or other feature selection components may be learned using an attentive transformer or another neural network. Similarly, some embodiments may then process a selected feature using a feature transformer. For example, some embodiments may use a feature transformer model that includes a set of fully connected neural network layers, a batch normalization operation, or a gated linear unit connected to a normalization residual connection to update the selected features into a normalized or otherwise processed form.

Some embodiments may use the set of aggregated information 310 to determine a set of clusters 312 that identifies or is otherwise associated with a set of user categories. By vectorizing features and clustering the feature vectors. For example, some embodiments may use the set of aggregated information 310 to determine a set of vectors, where the elements of the set of vectors may include or otherwise indicate feature values of the set of aggregated information 310. Some embodiments may perform a set of normalization operations on the feature values before using them in the set of vectors.

Some embodiments may use one or more clustering operations based on the set of vectors to determine the set of clusters 312. Some embodiments may perform one or more dimensional reduction operations such as those described above before performing one or more of the clustering operations. Additionally, some embodiments may provide a reporting component to present information usable for explaining cluster categorization or other model outputs. For example, some embodiments may include a reporting component that presents a set of names representing features selected when perform a set of clustering operation or weights indicating the relative contributions of the features to the set of clustering operations.

Various clustering methods may be used, such as a hierarchical clustering method or a K-means clustering method. For example, some embodiments may use a K-means clustering method after determining the set of vectors from the set of aggregated information 310. Some embodiments may determine an initial centroid or boundaries for a cluster based on a pre-determined set of user categories. For example, some embodiments may receive a pre-determined set of user categories that are labeled as "business owner," "student," "professional," "travel lover," "restaurant enthusiast," etc. In some embodiments, each respective user category of the set of user category is provided in association with a respective initial centroid vector in a vector space or a respective boundary in the vector space. Some embodiments may then apply a clustering method such as K-means clustering to determine a set of neighboring vertices of the centroid based on a distance between the set of neighboring vertices and the centroid. The distance may then be used to determine which vectors to include into each cluster.

Alternatively, or in addition, some embodiments may use a density-based clustering method such as an implementation of a density-based spatial clustering of applications with noise (DBSCAN) algorithm. For example, some embodiments may use DBSCAN to find the neighboring vectors of an initial vector that has been identified as being associated with one of a set of user categories. Some embodiments may then find vectors within a threshold distance of the initial vector and assign the vectors to a cluster of the initial vector or otherwise associate the vectors with the cluster. Some embodiments may verify whether a count of the vectors satisfies a count threshold. For example, some embodiments may restrict a definition of a cluster to clusters having at least three vectors, at least five vectors, etc. Some embodiments may assign a user to a user category based on the cluster(s) to which the user's corresponding vector is assigned.

While the above operations describe the use of clustering to classify users, some embodiments may perform one or more other methods to classify a user into one or more user categories without clustering to classify a user or may use one or more other methods in combination with clustering to classify a user. In some embodiments, a user category may be assigned to a user profile based on whether the user profile satisfies a set of feature value intervals. For example, the user category "candy eater" may be assigned to a user if the corresponding user profile indicates that the feature "amount of money spent on candy" satisfies the corresponding feature value interval corresponding to values greater than $5000, where a user that is indicated to have spent at least $5000 on candy will be classified with the user category "candy eater." Various other intervals or features may be used, where the interval may include closed boundary intervals, open boundary intervals, an interval having both a closed boundary and an open boundary, or infinite intervals. Some embodiments may use one or more learning operations, such as those described above, to select features, combinations features, feature intervals, or feature categories for categorizing users. For example, some embodiments may use a decoder transformer to reconstruct tabular features, where the accuracy of the reconstruction may be optimized during a self-supervised learning operation to determine which set of features are optimal for user classification tasks.

Some embodiments may use a trained language model 330 to generate one or more messages based on a user category or other features associated with a user. The trained language model 330 may be generated from a set of language models 314 that is trained using training data from a corpus of text-based data 316. For example, some embodiments may use a pre-trained language model such as the XLnet language model, a generative pre-trained transformer (GPT) model such as GPT-2 or GPT-3, or other language model. Some embodiments may use an auto-regressive language model, where an auto-regressive language model may include a feed forward neural network model that receives inputs from previous models.

Some embodiments may fine tune the language model using one or more additional operations. For example, some embodiments may apply one or more transfer learning operations by either using a first set of pre-trained neural network layers in conjunction with an additional set of neural network layers that are trained with the corpus of text-based data 316 (e.g., by using a layer freezing operation). Alternatively, or in addition, some embodiments may train a language model by using the weights, biases, or other neural network parameters of the language model as an initial set of parameters that may be modified or otherwise updated after an additional set of training operations.

The trained language model 330 may include a set of encoder neural network layers 334, where the set of encoder neural network layers may include a set of neural network layers that use a set of n-grams associated with a user category as text seed inputs. For example, some embodiments may determine that a user is associated with the user category "restaurant lover" and retrieve a set of text seeds that include the n-grams "nice meal," "enjoyable," etc. Some embodiments may determine a second set of text seeds based on an action category 318 selected by a user, where the action category may be selected from a plurality of possible action categories. For example, some embodiments may determine that a first action category is associated with the text seed "prime intent." Some embodiments may also determine one or more text seeds based on a time, such as time of day, a specific date, a time of year, etc. For example, some embodiments may determine that a current time is 10 days before the holiday "Thanksgiving." Some embodiments may then determine a set of attention weights 332 and use the set of attention weights 332 to determine which additional n-grams to select from a corpus when generating a message.

After encoding each of the text seeds using a trained neural network, some embodiments may then generate a message based on a set of decoder neural network layers 336. For example, some embodiments may receive a first text seed "nice meal" based on a user being assigned to the user category "restaurant lover," receive a second text seed "vending machines" based on the action category 318, and receive a third text seed "Thanksgiving" based on a current time. After encoding the text seeds using the set of encoder neural network layers 334 and determining which text to generate based on the attention weights 332, some embodiments may then use the set of decoder neural network layers 336 to generate a first message "Want to celebrate Thanksgiving? Consider our vending machines to get a nice meal."

After generating a message, some embodiments may check the generated message using a quality engine 340. The quality engine may include one or more systems to determine that a message is grammatically correct, satisfies one or more spellchecking systems, satisfies a profanity filter, etc. The quality engine may also include additional criteria to determine if the message satisfies one or more requirements associated with a communication medium. For example, some embodiments may use a quality engine to determine whether a generated message has too many words based on a set of criteria that is associated with the medium "social media message."

After verifying that the generated message satisfies the criteria of the quality engine 340, some embodiments may repeat one or more operations described in this disclosure to generate additional messages. Some embodiments may repeat one or more operations described in this disclosure to generate the set of three messages 351-353 outlined by the box 350. Some embodiments may implement a multi-armed bandit model based on an expected allocation value and an exploration parameter to select one of the three messages 351-353 to send. For example, some embodiments may use a message selection model 360 to assign a weight to each of the messages. For example, the message selection model 360 may include a multi-armed bandit learning model where a greater weight may increase the probability that the corresponding message is selected. Using the multi-armed bandit learning model may include determining the score using a function that increases the score in response to having a greater expected allocation value and increases the score in response to a greater exploration parameter. For example, the score of a message may decrease if its corresponding expected allocation value does not change but it is repeatedly sent. After the message selection model 360 is used, a message may then be selected, such as the message 362.

Example Flowchart

Figure 4:
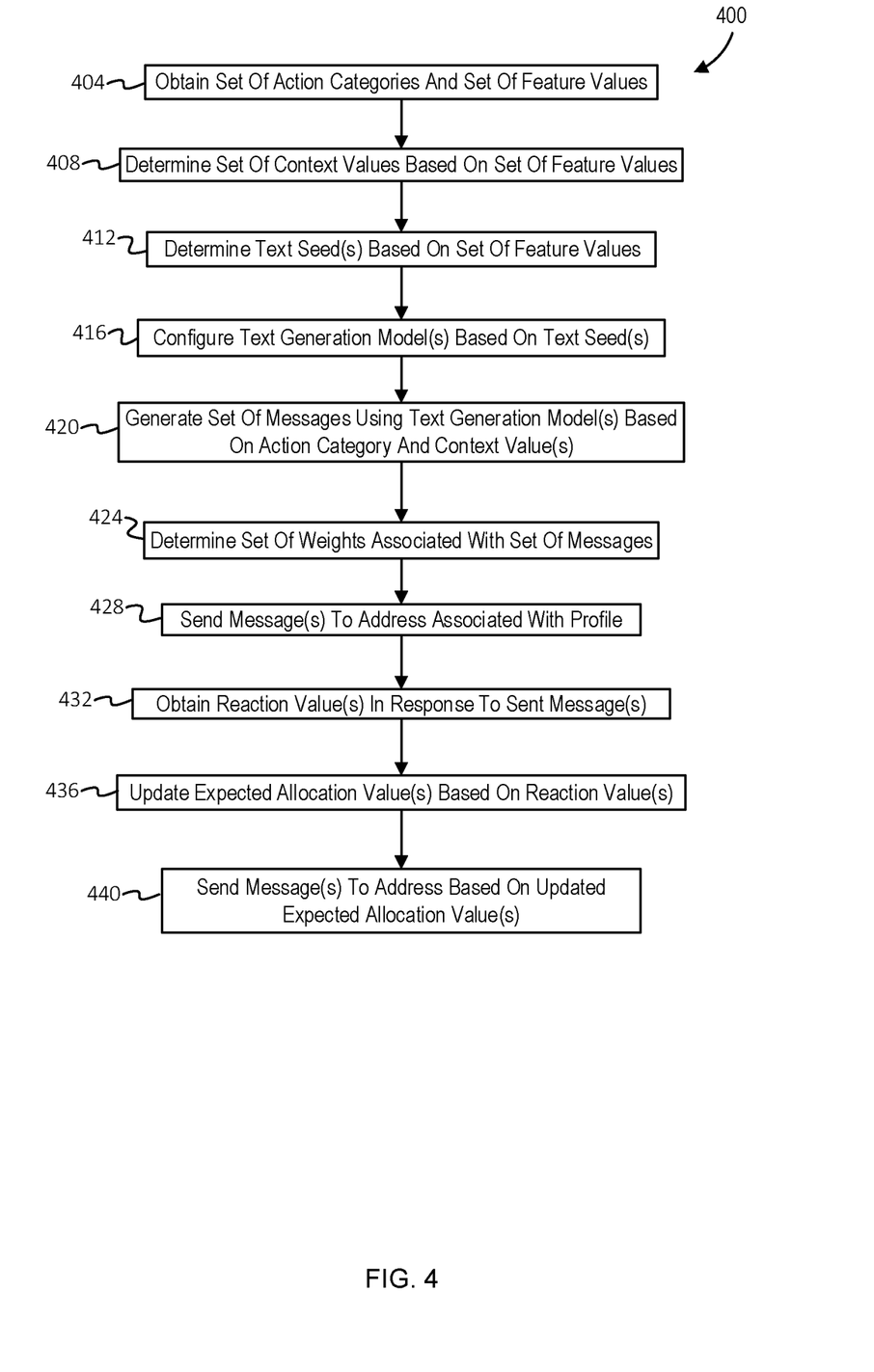
FIG. 4 shows a flowchart of operations to generate or select messages, in accordance with one or more embodiments.

FIG. 4 is an example flowchart of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in a system that includes one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of operations to generate or select messages, in accordance with one or more embodiments. Operations of the process 400 may begin at operation 404. In an operation 404, a set of action categories and a set of feature values may be obtained. In some embodiments, an action category may serve to represent an intent of a user. Some embodiments may directly obtain one or more action categories after a user selects the action category from a list of candidate action categories in a user interface. For example, the user may be presented with a list of candidate action categories including the list '["renew", "update", "restart"]' and select the action category "renew." Alternatively, or in addition, some embodiments may obtain a set of action categories from a third-party system after receiving a web message or other electronic communication including the set of action categories at an application program interface (API).

Some embodiments may obtain a plurality of candidate action categories by retrieving a stored set of candidate action categories and selecting one or more action categories from the plurality of candidate action categories. These candidate action categories may include more than five candidate action categories, more than 10 candidate action categories, more than 100 candidate action categories, or other number of candidate action categories. Some embodiments may retrieve a set of candidate action categories and determine a combined expected allocation value for each respective candidate action category of the candidate action categories. For example, some embodiments may receive a set of records, where each record identifies a candidate action category and an associated expected allocation values associated with the candidate action category. In some embodiments, the combined expected allocation value may be determined as an output of a function. In some embodiments, a function may use a plurality of expected allocation values as an input and calculate the combined expected allocation value as a weighted sum of expected allocation values and the probability that those expected allocation values will be fulfilled. For example, some embodiments may determine a combined expected allocation value based on a first expected allocation value "100" with an associated probability weight of 0.25, a second expected allocation value "200" with an associated probability weight of 0.5, and a third expected allocation value "0" with an associated probability weight of 0.25, where each expected allocation value may be based on a predicted value. Some embodiments may then use a function that determines the combined expected allocation value for an action category as the weighted sum of each expected allocation value multiplied by its associated probability weight.

Some embodiments may determine a combined expected allocation value using a statistical model. For example, some embodiments may determine a measure of central tendency, such as a mean average or a median value based on a history of results associated with the action category. If each candidate action category of a set of candidate action categories is associated with a set of reaction values, some embodiments may include a history of reaction values with a corresponding candidate action category. For example, a first action category may be associated with a set of possible reaction values that include a first possible reaction value of "1" indicating success and a second possible reaction value of "0" indicating failure. Some embodiments may store a history of past reaction values associated with the action category for a user, where the history may be stored in a corresponding user profile or other repository of data. Some embodiments may then determine a mean average of the reaction values to determine a combined expected allocation value. For example, if a user is indicated by their corresponding user profile to have three successful reaction values of "1" and two unsuccessful reaction values of "0" associated with five previous messages generated from a first candidate action category, some embodiments may determine that the first candidate action category is associated with a combined expected allocation value of "0.6,"

where the combined expected allocation value was determined as the mean average value of the set of values "[1, 1, 1, 0, 0]."

Some embodiments may determine a combined expected allocation value using a neural network model. Various types of neural network models may be used, such as a feedforward neural network, recurrent neural network, etc. For example, some embodiments may use a feedforward neural network to predict a combined expected allocation value associated with a profile for a user. Some embodiments may use a neural network model that is trained with data associated with the user, where the training may cause updates or other changes to neural network parameters such as neuron weights, neural network biases, activation function parameters, etc. Alternatively, or in addition, some embodiments may implement versions of transfer learning by storing sets of neural network parameters.

After determining that a combined expected allocation value for a user satisfies a messaging threshold, some embodiments may select the candidate action category for use to generate a message. For example, after determining that a combined expected allocation value of 0.831 is greater than a messaging threshold equal to 0.500, some embodiments may elect to send a message based on the candidate action category associated with the combined expected allocation value. By restricting messages to users having an expected allocation value that satisfy one or more messaging thresholds, some embodiments may reduce data and bandwidth consumption by reducing the total number of messages being generated and distributed.

Some embodiments may determine a set of appropriate users for a candidate action category. In some embodiments, a user that is appropriate for a candidate action category may have a corresponding profile that satisfies one or more profile condition. For example, a candidate action category may be associated with a profile condition that requires a user profile have a first set of permissions activated for at least one year. Some embodiments may then select a set of users that have profiles satisfying the profile condition. After selecting the set of users, some embodiments may then perform one or more of the operations described in this disclosure using the selected set of users.

Some embodiments may obtain a set of feature values by retrieving a profile record, such as an organization profile identifying an organization to which multiple users may belong, a user profile associated with a specific user, or some other record identifying an entity. For example, some embodiments may retrieve a user profile storing values such as a credit score, a count of previous times user had accessed a specific data repository, an amount of an asset stored in an account, etc. Some embodiments may obtain a plurality of profiles or otherwise accessing a server storing the plurality of profiles. For example, some embodiments may obtain a population of user profiles, where the population of user profiles may include more than 100 user profiles more than 1000 user profiles more than 10,000 user profiles more than 1 billion user profiles, etc. As further described below, some embodiments may perform one or more operations to update the population of user profiles with an updated user profile.

In some embodiments, the set of feature values may include an indication of user activity, such as a list of transactions associated with the user, information provided by the user via a user interface element, computer resource use by the user, etc. For example, some embodiments may obtain a set of feature values that includes a list of visits to a set of web addresses. Some embodiments may then select a candidate action category based on the list of web addresses visited by the user. For example, some embodiments may select a first action category from a list of five candidate action categories based on the user frequently visiting a set of web addresses associated with the first action category. Alternatively, or in addition, indications of user activity or other feature values may be used to determine a combined expected allocation value using a machine learning model.

In an operation 408, some embodiments may determine a set of context values based on the set of feature values. The set of context values may include the set of feature values. Alternatively, or in addition, some embodiments may compute one or more of the set of context values based on the set of feature values. For example, some embodiments may determine a user category based on the set of feature values.

A user category may be determined using one or more types of machine learning models. Some embodiments may determine a user category using an unsupervised learning method, such as a clustering method. Various types of clustering methods may be used, such as K-means clustering, density-based clustering, etc. Some embodiments may train a learning system to associate regions in a feature dimension space with a set of user categories. For example, some embodiments may use a K-means clustering method to determine clusters based on sets of feature values. Some embodiments may then be configured to define regions in a feature dimension space associated with different user categories. For example, some embodiments may define users in a feature dimension space associated with a first feature score between 700 and 750 and a transaction score between 500 and 1000 with a user category of "user category type 01."

In some embodiments, a set of context values may include a context vector, where a context vector may include an array representing values in a feature dimension space. Some embodiments may determine a context vector that includes data related to categorical values by using a one hot encoding method. Some embodiments may generate a context vector based on a set of feature values that includes the first and second future value and increases a number of context vectors to include a different dimension for each of the set of possible categories, where at least one field in the different dimensions is non-zero. The non-zero values in the different dimensions may indicate that the original category is filled with a category value corresponding to the non-zero features. For example, some embodiments may obtain a set of feature values including the first feature value 0.1, the second feature value 0.75, and the third feature value "Cat1," where the third feature value is a category selected from a set of possible categories '["Cat1", "Cat2", "Cat3"].' The corresponding context vector may be represented as, "[0.1, 0.75, 1, 0, 0]," where the last three elements of the vector may indicate that the possible category "Cat1" was selected and that the other two possible categories were not selected. Alternatively, while the previous example showed setting a value representing a non-selected possible category as zero, some embodiments may use a Null value or other value to represent a non-selected possible category.

In some embodiments, a set of feature values may include quantitative values, such as previous scores for a type of feature. For example, some embodiments may include a sequence of quantitative score changes of scores, such as "[10, 12, 8, 14]," where the history of scores may be used to predict behavior trends or other context values. Some embodiments may determine a set of quantitative score changes based on the history of scores and determine a user category based on the history of scores or their corresponding changes over time. Some embodiments may use a neural network model or other machine learning model to predict a context value for a user based on the user's history of transactions in a previous month. For example, some embodiments may use a recurrent neural network to determine whether to label a user as having a user category type of "user behavior type 02" based on their transaction history. Additionally, in some of embodiments, a sequence of quantitative score changes may be associated with an action category. By associating a set of quantitative values or their corresponding context values with a specific action category, some embodiments may avoid spending additional computational resources if that specific action category was not selected.

In an operation 412, some embodiments may determine a set of text seeds based on the set of feature values. In some embodiments determining the set of text seeds based on the set of feature values may include first determining a set of context values based the set of feature values and their determining the text seeds based on the set of context values. A text seed may include various types of n-grams, such as syllables, words, phrases, etc. For example, a text seed may include specific words such as "offer," phrases such as "blue level," or special data elements such as emojis. Some embodiments may determine a text seed based on a combination of the set of feature values and one or more action categories. For example, some embodiments may determine the text seed "Christmas savings" based on a selected action category and the set of feature values.

In addition to text seeds, other machine learning model parameters may be retrieved based on a set of feature values. For example, as further described below, some embodiments may retrieve a first set of neural network parameters based on a first set of feature values categorizing a user as a first type of user and a second set of neural network parameters based on a second set of feature values categorizing a user as a second type of user. Some embodiments may then configure different instances of one or more machine learning models based on the different set of neural network parameters, as further described below.

In an operation 416, some embodiments may configure a set of text generation models based on the set of text seeds. Various text generation models may be used and may include natural language processing models based on one or more neural networks such as transformer neural networks. A transformer neural network may include operations to encode one or more n-grams of a document in the form of a learned representation such as a vector. Various types of transformer neural networks may be used, such as a neural network of the GPT-3 model. For example, some embodiments may use a multi-headed attention-based autoencoder. A multi-headed attention-based autoencoder may be trained to use attention values that are mapped to n-grams, where the attention values for an n-gram may be determined using sets of attention weights. In some embodiments, the set of attention weights may be determined based on a corresponding set of learned representations (e.g., "tokens").

In some embodiments the tokens may include word vectors determined from a set of encoder neural network layers, where the encoder neural network layers may implement a feed forward architecture to increase encoding efficiency. For example, some embodiments may use an autoencoder similar to those described by Vaswani et al. (Vaswani, Ashish, Noam Shazeer, Niki Parmar, Jakob Uszkoreit, Llion Jones, Aidan N. Gomez, Lukasz Kaiser, and Illia Polosukhin. "Attention is all you need." In Advances in neural information processing systems, pp. 5998-6008. 2017, arXiv:1706.03762), which is incorporated herein by reference. During use of a multi-headed attention model, some embodiments may use one or more of the text seeds as an initial set of n-grams and determine additional n-grams to generate text. For example, some embodiments may generate a sequence of tokens based on the text seeds, where the sequence of tokens may include a first set of tokens to represent the text seeds, and may include one or more masked tokens after or interleaved into the first set of tokens. A masked token may be pre-defined with a token value that indicates that a token having the token value is to be replaced with another token. For example, each token having the token value "[0, 0, 0, 0, 0]" may be determined to be a masked token. Some embodiments may then determine or otherwise update a set of attention weights to generate a set of masked attention weights. The set of masked attention weights may reduce weights corresponding to the set of tokens having a position value exceeding a threshold range, where the threshold range may include a limit at the end of a sequence of n-grams or between the positions of n-grams corresponding to the text seeds. Some embodiments may then determine a subsequent token using a sequence of neural network layers based on the set of masked attention weights and the set of tokens. Some embodiments may adapt a transformer model for text generation by masking the last token at the end of the sequence of tokens and using a neural network to determine a vector output based on the sequence, where the vector output may map to a word or other n-gram.

As described above, some embodiments may configure a text generation model based on parameters specific to a target user or category of the target user (e.g., a user category determined based on a set of feature values of a user profile). For example, in addition to providing a set of text seeds corresponding to a target user, some embodiments may load a specific set of neural network parameters of a set of neural network layers stored in association with a target user type. As discussed elsewhere in this disclosure, a set of neural network parameters may include weights, biases, activation function parameters, etc.

As discussed further below, some embodiments may configure a plurality of text generation models to generate a plurality of messages. In some embodiments, the plurality of text generation models may differ with respect to the text seeds they are provided, where each respective text generation model is provided with a respective set of text seeds that differ from other sets of text seeds provided to other text generation models. For example, a first text generation model configured with a first set of the text seeds that includes the n-grams "regular coffee" and "jazz," and a second text generation model may be configured with a second set of text seeds that includes the n-grams "regular coffee" and "latte."

In an operation 420, some embodiments may generate a set of messages using the set of text generation models based on the set of action categories and the set of context values. Some embodiments may use a transformer neural network model to generate text, where the transformer neural network model may include models such as the GPT model, where versions of the GPT model may include a GPT-2 or GPT-3 models. As described above, using a transformer neural network may include using a set of encoder neural network layers to convert syllables, words, phrases or other n-grams into vector outputs in an embedding space or some other learned representation. Using the transformer neural network may also include using a second set of neural network layers to decode the vector outputs and predict a set output words, phrases, or other n-grams to augment the input set of n-grams at masked n-gram positions.

In some embodiments, a plurality of neural networks may be used to generate a plurality of messages. For example, a first neural network configured with a first set neural network parameters may be used to generate a first message, and a second neural network configured with a second set neural network parameters may be used to generate a second message, where the first and second set of neural network parameters may be different with respect to each other. Additionally, some embodiments may configure a plurality of text generation models with different sets of neural network parameters, where each respective text generation models may use a respective set of neural network parameters that differ from other sets of neural network parameters used by other text generation models. In some embodiments, the respective set of neural network parameters may correspond with a respective set of set of text seeds such that a text generation model configured with the respective set of text seeds is also configured with the respective set of neural network parameters. Alternatively, or in addition, a respective set of neural network parameters may be shared by different neural network models, where the different neural network models may differ with respect to their corresponding text seeds.

In an operation 424, some embodiments may determine a set of weights associated with the set of messages. A set of weights may be used to determine which messages of the generated set of messages should be sent or otherwise communicated to a target user. Based on a comparison between different weights, some embodiments may then determine which message(s) to send to a user.

Some embodiments may determine the set of weights based on an expected allocation value and a set of previous messages. In some embodiments, the expected allocation value may be encoded as a reward value of a learning model, such as a reward value of a multi-armed bandit learning model. For example, some embodiments may use a trained neural network or other machine learning model to determine a learning-predicted allocation value for a multi-armed bandit learning model. Some embodiments may have trained the neural network based on a previous set of messages sent to a target audience, where the trained neural network may be specific for a target user via the target user's profile or one or more categories of the target user. In some embodiments, instead of or in addition to determining a learning-predicted allocation value based on the sequence of all the n-grams of a message generated with a text generation model, some embodiments may determine an allocation value based on the text seeds or other text generation parameters used to configure the text generation model.

Some embodiments may use the expected allocation value in conjunction with an exploration parameter of a multi-armed bandit learning model to determine a weight for a message. Various types of functions may be used to determine the weight as a function output, where the function output may be positively correlated with an expected allocation value. Alternatively, or in addition, the function output may be negatively correlated with a count of the set of previous messages associated with the expected allocation value, where the count of the set of previous messages may represent the amount of times that the message or the text generation parameters have already been used to distribute a message to a user.

In some embodiments, the weights of different messages may be compared to each other to determine one or more messages for use. Alternatively, or in addition, some embodiments may use a predicted allocation value to determine whether a reward threshold is satisfied and, in response, update a user profile based on the response to indicate whether a set of text seeds or other text generation parameters are suggested to be effective. For example, some embodiments may predict a user will assign at least 10 hours to a project as a learning-predicted allocation value after receiving a request to contribute to the project in a first message, where a corresponding reward threshold is a minimum of 5 hours. In response to the learning-predicted allocation value satisfying the reward threshold, some embodiments may increase the n-gram weights associated with the text seeds used to generate the first message.

Some embodiments may determine that a message or a corresponding set of parameters used to generate the message are not associated with an expected allocation value. For example, some embodiments may use a new set of data that does not include any historical data usable to determine an expected allocation value for a message. Some embodiments may then use an expected allocation value associated with a generalized category ("category expected allocation value"), where the generalized category may be associated with a user category. For example, a first user may have been sent multiple messages generated from parameters associated with a first user category and a first action category, and a second user may have been sent no messages generated from parameters associated with the first user category or the first action category. Some embodiments may retrieve or calculate an expected allocation value for the first user, where the expected allocation value may have been determined based on the history of user responses provided by the first user. Some embodiments may determine that a data field of the second user for the expected allocation value ("expected allocation value field") is empty or does not exist. In response, some embodiments may fill the data field with a category expected allocation value in place of the expected allocation value or otherwise use the category expected allocation value associated with the first user category and the first action category.

In an operation 428, some embodiments may send one or more of the messages to an address associated with a profile. In some embodiments, the address may include an electronic address, such as a web address, an e-mail, an application program interface, etc. Alternatively, or in addition, the address may include a phone number, physical address, or other contact identifier. Some embodiments may send a single message to the user indicated by the profile, where the single message may be generated using one or more of the operations described in this disclosure. Alternatively, or in addition, some embodiments may send a plurality of the messages determined using one or more operations described in this disclosure to the target user indicated by a profile via one or more of the target user's address. For example, some embodiments may select the top three messages of a plurality of messages generated using one or more operations described above and sequentially or concurrently distribute a first message to an email address associated with the user, a second message to a phone number of the user, and a third message to a social media platform account.

In an operation 432, some embodiments may obtain one or more reaction values in response to the set of sent messages. Various types of reaction values may be provided by a target user, where some embodiments may use alternative names for a reaction value, such as a "response value." In some embodiments, a non-response may be converted or encoded as a type of reaction, as described further below. A user may be able to provide a reaction value in the form of a responding text message, a responding email, a voice recording that is then translated into machine-interpretable text, a message sent via an online messaging platform, a message sent via an online social media platform, etc.

Some embodiments may receive the reaction value for a first message in the form of a user response that includes an identifier associated with a first message. In some embodiments, the identifier may specifically identify the first message. For example, a first message that was generated and sent to a target user using one or more of the operations described above may have been sent with a first message identifier that identified the first message. Some embodiments may obtain a user response that includes the first message identifier. For example, some embodiments may send the message in the form of an email and receive a reply message that includes the first message identifier. Alternatively, or in addition, some embodiments may receive an identifier that identifies the target user. Some embodiments may then determine or assign the reaction value to the first message based on a determination that the first message was the most recent message sent to the target user. For example, some embodiments may receive a user response to a first message sent via an online messaging platform and, in response, identify the user from the account handle associated with the messaging platform response.

As described above, some embodiments may assign a reaction value to a first message even if a user does not provide a direct user response to the first message. For example, some embodiments may determine whether a reaction value for a first message was received within a duration threshold. If a reaction value was not provided by a user within the duration threshold, some embodiments may assign a reaction value to the first message that indicates no user response was provided.

In an operation 436, some embodiments may update a set of expected allocation values based on the set of reaction values. Some embodiments may update a first expected allocation value based on a response message. The expected allocation value may be determined based on a target response and may be different for different target responses. For example, some embodiments may increase the first expected allocation value for a first message in response to a determination that a target reaction value was received in response to the first message.

Some embodiments may update a first expected allocation value based on a quantitative amount, where the quantitative amount may correspond to a target user reaction performed by a target user. For example, some embodiments send a first message to a target user requesting a score change to an account of the target user. Some embodiments may use the score change made by the target user as a reaction value, where the score change may vary across different users. Some embodiments may then determine a change to the expected allocation value based on the score change and an indication that the target user reaction is an increase in the score.

As described elsewhere in this disclosure, some embodiments may store the set of expected allocation values in a persistent storage. For example, after some embodiments may store the set of expected allocation values in a record that is associated with a target user in a set of memory devices, such as solid-state memory devices or spinning disk memory devices. Some embodiments may then use the expected allocation values based on additional operations to select messages or transfer these values for use by another machine learning model during a transfer learning operation.

In an operation 440, some embodiments may send one or more of the messages to an address based on the set of updated expected allocation values. After the update to an expected allocation value, some embodiments may use the updated expected allocation value to re-determine the set of weights for a set of messages and may select a different message or a message generated from a different set of text generation parameters. For example, a first message may have been selected and sent to a user based on a weight computed from a first expected allocation value. After updating the first expected allocation value in response to receiving a user response, some may re-determine the weight based on the updated first expected allocation value and, in response, select a different message. Some embodiments may then send the different message to a user using operations similar to or the same as those described for operation 428. Alternatively, or in addition, some embodiments may send a follow-up message to a user using a different communication medium form the one used to send an initial message.

In some embodiments, the various computers and subsystems illustrated in FIG. 1 may include one or more computing devices that are programmed to perform the functions described herein. The computing devices may include one or more electronic storages (e.g., database(s) 132, which may include data corpus database(s) 134, model database(s) 136, user database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory, computer-readable storage media that electronically stores information. The storage media of the electronic storages may include one or both of (i) system storage that is provided integrally (e.g., substantially non-removable) with servers or user devices; or (ii) removable storage that is removably connectable to the servers or user devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the set of processors, information obtained from servers, information obtained from user devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems or other components described herein is for illustrative purposes, and is not intended to be limiting, as any of subsystems other components may provide more or less functionality than is described. For example, one or more of subsystems may be eliminated, and some or all of its functionality may be provided by other ones of the subsystems.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" etc. refer to actions or processes of a specific apparatus, such as a special purpose computer or a similar special purpose electronic processing/computing device. As used in this application, updating data may include modifying data already stored in a storage or creating the data and storing the newly-created data in storage.

The present techniques will be better understood with reference to the following enumerated embodiments:

1. A method comprising: obtaining an action category, a plurality of text seeds, and a profile comprising a set of feature values; generating a set of context values for a user based on the set of feature values; obtaining a set of text generation models based on the plurality of text seeds, wherein each respective text generation model differs from other text generation models with respect to a set of neural network parameters corresponding to a respective text seed of the plurality of text seeds; generating a set of messages comprising a first message using the set of text generation models based on the action category and the set of context values; associating the set of messages with a set of expected allocation values based on the plurality of text seeds, the associating comprising associating the first message with a first expected allocation value; determining a set of weights comprising a first weight associated with the first message, wherein the first weight is determined based on the first expected allocation value, and wherein each other respective weight of the set of weights is determined based on a respective other expected allocation value and a set of previous messages associated with a text seed of the plurality of text seeds; sending the first message to an address associated with the profile based on a comparison between the first weight and other weights of the set of weights; obtaining a reaction value from the user in response to the first message; and updating the first expected allocation value based on the reaction value.

2. The method of embodiment 1, wherein obtaining the set of text generation models comprises generating a first text generation model of the set of text generation models, and wherein generating the first text generation model of the set of text generation models comprises: determining a first set of neural network layers of the first text generation model based on the action category; determining a second set of neural network layers of the first text generation model based on the set of context values, wherein a first vector output of the first set of neural network layers is provided as an input to the second set of neural network layers to generate a second vector output; and determining a third set of neural network layers of the first text generation model based on the set of weights, wherein: the second vector output is provided as an input to the third set of neural network layers; and generating the set of messages using the set of text generation models comprises using the first text generation model to generate the first message.

3. The method of any of embodiments 1 to 2, wherein the action category is a first action category, and wherein obtaining the first action category comprises: obtaining a candidate action category; determining whether the profile satisfies a profile condition, the profile condition associated with the candidate action category; and in response to a determination that the profile satisfies the profile condition, using the candidate action category as the first action category, wherein generating the set of messages comprises generating the set of messages based on the candidate action category.

4. The method of any of embodiments 1 to 3, further comprising obtaining a set of tokens based on the action category, wherein generating the set of messages comprises generating the set of messages based on the set of tokens.

5. The method of any of embodiments 1 to 4, wherein obtaining the set of text generation models comprising obtaining a first text generation model, and wherein the method further comprises: generating a sequence of tokens comprising the set of tokens and a masked token, wherein the masked token is at the end of the sequence of tokens; and using a set of neural network layers of the first text generation model to replace the masked token with a token corresponding to a vector output of the first text generation model.

6. The method of any of embodiments 1 to 5, wherein generating the set of messages comprises using a first text generation model of the set of text generation models, and wherein using the first text generation model comprises determining a subsequent token based on the set of tokens of the first text generation model by: determining a set of attention weights corresponding to the set of tokens using a feed forward neural network of the first text generation model; updating a portion of the set of attention weights to generate a set of masked attention weights, wherein the set of masked attention weights reduces weights corresponding to the set of tokens having a position value exceeding a threshold range; and determining the subsequent token using a sequence of neural network layers of the first text generation model based on the set of masked attention weights and the set of tokens.

7. The method of any of embodiments 1 to 6, wherein generating the first message comprises generating the first message using a first text generation model of the set of text generation models, the method further comprising: determining whether the reaction value indicates that a target action associated with the action category was satisfied; in response to a determination that the reaction value indicates that the target action associated with the action category was not satisfied, generating a second message using a second text generation model of the set of text generation models; and sending the second message to the address.

8. The method of any of embodiments 1 to 7, wherein: the profile is a first profile; the first profile is associated with a user category; a second profile is associated with the user category; the user category is associated with a category expected allocation value, wherein the category expected allocation value is associated with a first text seed of the plurality of text seeds; and the method further comprise: generating a second plurality of messages based on the action category, a second set of features of the second profile, and the plurality of text seeds; determining a second set of weights for the second plurality of messages, wherein the second set of weights comprises a second weight associated with the second profile and the first text seed, and wherein determining the second set of weights comprises: determining whether an expected allocation value field of the second profile is filled, wherein the expected allocation value field is associated with the first text seed; and in response to a determination that the expected allocation value field is not filled, using the category expected allocation value to determine the second weight; and sending the first message to the address based on a comparison between the second weight and other weights of the second set of weights.

9. The method of any of embodiments 1 to 8, wherein the set of context values comprises a user category, the method further comprising: determining the plurality of text seeds based on the set of feature values; and storing the updated first expected allocation value in persistent storage.

10. The method of embodiment 9, wherein: the action category is a first action category; the set of feature values comprises an indication of visits to a set of web addresses; and obtaining the first action category comprises: obtaining a plurality of action categories, the plurality of action categories comprising the first action category; and using a candidate action category of the plurality of action categories as the first action category based on the indication of the visits to the set of web addresses, wherein generating the first message comprises generating the first message based on the candidate action category.

11. The method of any of embodiments 9 to 10, further comprising determining whether a response message to the first message was received within a duration threshold, wherein updating the first expected allocation value comprises reducing the first expected allocation value in response to the response message not being received within the duration threshold.

12. The method of any of embodiments 9 to 11, further comprising: obtaining a response message corresponding to the first message, the response message comprising an identifier associated with the first message; and determining the reaction value based on the response message, wherein the reaction value comprises a quantitative amount, wherein updating the first expected allocation value comprises modifying the first expected allocation value based on the quantitative amount.

13. The method of any of embodiments 9 to 12, wherein: labeling the profile with a second user category based on the set of feature values and a set of feature value intervals associated with the second user category, wherein at least one feature value of the set of feature values is within a feature value interval of the set of feature value intervals; and determining a first set of neural network layers based on the second user category, wherein generating the set of messages comprises using a text generation model comprising the first set of neural network layers.

14. The method of any of embodiments 9 to 13, further comprising updating the plurality of text seeds based on the second user category.

15. The method of any of embodiments 9 to 14, wherein: determining the first weight comprises determining a function output of a function; the function output is positively correlated with the first expected allocation value; and the function output is negatively correlated with a count of the set of previous messages associated with the first expected allocation value.

16. The method of any of embodiments 9 to 15, wherein: the action category indicates a target user reaction; the set of feature values is associated with the user profile; the user profile is associated with a user; the set of text seeds comprises a first text seed and a second text seed; configuring the set of text generation models comprises configuring a text generation model with a first set of neural network parameters corresponding to the first text seed and the text generation model with a second set of neural network parameters corresponding to the second text seed; generating the set of messages comprises generating the first message using the text generation model configured with the first set of neural network parameters and a second message using the text generation model configured with the second set of neural network parameters based on the action category and the user category; determining the set of weights comprises determining a first weight associated with the first message based on the first expected allocation value of the user profile and a count of previous messages associated with the first text seed; the first expected allocation value is associated with the first text seed, and determining a second weight associated with the second message based on a second expected allocation value of the user profile and a count of previous messages associated with the second text seed; the second expected allocation value is associated with the second text seed; sending the first message comprises sending the first message to an electronic address and not sending the second message based on a comparison between the first weight and the second weight; the reaction value indicates a user response with respect to the target user reaction; storing the updated first expected allocation value comprises determining whether the reaction value satisfies a threshold based on the action category; in response to a determination that the reaction value satisfies the threshold, updating the first expected allocation value; and storing, in persistent storage, the updated first expected allocation value.

17. The method of embodiment 16, wherein the action category is a first action category, and wherein obtaining the first action category comprises: obtaining a plurality of action categories, the plurality of action categories comprising the first action category; using a neural network to determine a combined expected allocation value for each respective action category of the plurality of action categories, the neural network receiving, as input, expected allocation values of the user profile; determining whether the combined expected allocation value of a candidate action category satisfies a messaging threshold; and in response to a determination that the combined expected allocation value of the candidate action category satisfies the messaging threshold, using the candidate action category as the action category, wherein generating the first message comprises generating the first message based on the candidate action category.

18. The method of any of embodiments 16 to 17, wherein the user profile is a first user profile, and wherein the action category is a first action category, and wherein obtaining the first action category comprises: obtaining a population of user profiles, the population of user profiles comprising the first user profile; and determining a subset of user profiles from the population of user profiles by, for each respective user profile of the subset of user profiles: using a neural network to determine a learning-predicted allocation value; determining whether the learning-predicted allocation value satisfies a reward threshold; and updating the subset of user profiles to add the respective user profile to the subset of user profiles based on a determination that the learning-predicted allocation value satisfies the reward threshold.

19. The method of any of embodiments 16 to 18, wherein determining the user category further comprises: determining whether a first feature value is a categorical value, wherein the first feature value corresponds to a first feature; obtaining a set of possible categories for the first feature; and determining a context vector, wherein: the context vector comprises a first set of values set to zero or null, wherein each element of the first set of values indicates a possible category other than the first feature value; the context vector comprises a non-zero value for an element associated with the first feature value; and a count of the first set of values is less than the set of possible categories for the first feature; and determining the user category based on the context vector.

20. The method of any of embodiments 16 to 19, wherein determining the user category comprises: obtaining a set of quantitative score changes; generating a sequence of quantitative score changes based on score changes labeled in association with the action category; and determining the user category using a neural network based on the sequence of quantitative score changes.

21. A non-transitory, computer-readable media storing instructions that, when executed by one or more processors, effectuate operations comprising those of any of embodiments 1 to 21.

22. A system comprising: one or more processors; and memory storing instructions that, when executed by the processors, cause the processors to effectuate operations comprising those of any of embodiments 1 to 21.

What is claimed is:

1. A system for generating text using multiple seeds that comprises one or more processors and one or more non-transitory, machine-readable media storing instructions that, when executed by the one or more processors, causes operations comprising:

obtaining a first seed and a second seed;

generating a first message using a first set of parameters corresponding with the first seed and a second message using a second set of parameters corresponding with the second seed;

determining a first weight associated with the first message based on a first allocation value of a profile, wherein the first allocation value is associated with the first seed;
determining a second weight associated with the second message based on a second allocation value of the profile, wherein the second allocation value is associated with the second seed;
selecting the first message based on the first weight and the second weight; and
updating the first allocation value in response to a determination that a reaction value associated with the first message satisfies a threshold.

2. A method comprising:
obtaining a first seed and a second seed;
generating a first message using a first set of parameters corresponding with the first seed and a second message using a second set of parameters corresponding with the second seed;
determining a first weight associated with the first message based on a first allocation value of a profile and a second weight associated with the second message based on a second allocation value of the profile, wherein the first allocation value is associated with the first seed and the second allocation value is associated with the second seed;
selecting the first message based on the first weight and the second weight; and
updating the first allocation value in response to a determination that a reaction value associated with the first message satisfies a threshold.

3. The method of claim 2, wherein obtaining the first seed comprises obtaining the first seed based on data of the profile.

4. The method of claim 2, further comprising obtaining an action category based on the profile, wherein:
generating the first message comprises generating the first message based on the action category; and
generating the second message comprises generating the second message based on the action category.

5. The method of claim 2, further comprising:
using a machine learning model to determine a learning-predicted allocation value based on the first message;
determining that the learning-predicted allocation value satisfies a reward threshold; and
updating a weight of the profile based on the determination that the learning-predicted allocation value satisfies the reward threshold.

6. The method of claim 2, further comprising:
determining a plurality of possible categories based on a user-related value;
determining a set of context values based on the user-related value; and
selecting a category of the plurality of possible categories based on the set of context values, wherein generating the first message comprises generating the first message based on the category.

7. The method of claim 2, further comprising:
obtaining a set of quantitative score changes of the profile; and
determining a category based on the set of quantitative score changes, wherein generating the first message comprises generating the first message based on the category.

8. The method of claim 2, further comprising:
obtaining a set of electronic addresses associated with the profile; and
selecting a first category from a plurality of categories based on the set of electronic addresses, wherein generating the first message comprises generating the first message based on the first category.

9. The method of claim 2, further comprising determining a result indicating that a response message to the first message was not received within a duration threshold, wherein updating the first allocation value comprises reducing the first allocation value in response to the result indicating that the response message was not received within the duration threshold.

10. The method of claim 2, further comprising:
labeling the profile with a category based on a set of feature values of the profile and a set of feature value intervals associated with the category; and
determining a first set of learning model parameters for a text generation model based on the category, wherein generating the first message comprises generating the first message using the text generation model.

11. One or more tangible, non-transitory, machine-readable media storing instructions that, when executed by one or more processors, causes the one or more processors to effectuate operations comprising:
obtaining a first seed and a second seed;
generating a first message using a first set of parameters corresponding with the first seed and a second message using a second set of parameters corresponding the second seed;
determining a first weight associated with the first message based on a first allocation value of a profile and a second weight associated with the second message based on a second allocation value of the profile, wherein the first allocation value is associated with the first seed and the second allocation value is associated with the second seed;
selecting the first message based on the first weight and the second weight; and
updating the first allocation value in response to a determination that a reaction value associated with the first message satisfies a threshold.

12. The one or more machine-readable media of claim 11, the operations further comprising:
obtaining a response message comprising an identifier associated with the first message; and
determining the reaction value based on the response message.

13. The one or more machine-readable media of claim 11, the operations further comprising:
obtaining a category based on the profile; and
updating a plurality of seeds based on the category, wherein obtaining the first seed and the second seed comprises obtaining the first and second seeds from the plurality of seeds.

14. The one or more machine-readable media of claim 11, wherein:
determining the first weight comprises determining the first weight based on an output of a function;
the output is positively correlated with the first allocation value;
the output is negatively correlated with a count of a set of previous messages associated with the first allocation value.

15. The media of claim 11, the operations further comprising:
obtaining a category and a text generation model;
determining a set of context values based on the profile;

determining a first set of neural network layers of the text generation model based on the category; and determining a second set of neural network layers of the text generation model based on the set of context values, wherein:

a first output of the first set of neural network layers is provided as an input to the second set of neural network layers to generate a second output;

the first set of parameters comprises the first and second sets of neural network layers; and generating the first message comprises generating the first message based on the second output.

16. The one or more media of claim 11, the operations further comprising:

obtaining a candidate category of a set of categories;

determining whether the profile satisfies a profile condition associated with the candidate category; and in response to a determination that the profile satisfies the profile condition, selecting the candidate category as a selected category, wherein generating the first message comprises generating the first message based on the selected category.

17. The one or more media of claim 11, wherein generating the first message comprises:

determining a set of attention weights corresponding to a set of tokens using a neural network of a text generation model, wherein the set of tokens is obtained based on a category;

updating a portion of the set of attention weights to generate a set of masked attention weights, wherein the set of masked attention weights reduces weights corresponding to the set of tokens having a position value exceeding a threshold range; and determining a subsequent token using a sequence of neural network layers of the text generation model based on the set of masked attention weights and the set of tokens, wherein generating the first message comprises generating the first message based on the subsequent token.

18. The one or more media of claim 11, the operations further comprising:

generating a sequence of tokens comprising a set of tokens and a masked token based on a category; and using a set of neural network layers of a text generation model to replace the masked token with a predicted token based on an output of the text generation model, wherein generating the first message comprises generating the first message based on the predicted token.

19. The one or more media of claim 11, wherein:

generating the first message comprises generating the first message using a first text generation model based on a category; and the first text generation model is configured with the first set of parameters;

the operations further comprising:

determining whether the reaction value indicates that a target action associated with the category was satisfied;

in response to a determination that the reaction value indicates that the target action associated with the action category was not satisfied, generating a third message using a second text generation model different from the third text generation model; and sending the third message to an address of the profile.

20. The one or more media of claim 11, wherein:

the profile is associated with a category;

the category is associated with a category allocation value;

the category allocation value is associated with the first seed; and determining the first weight comprises using the category allocation value to determine the first weight by:

determining whether an allocation value field of the profile is filled; and in response to a determination that the allocation value field is not filled, using the category allocation value to determine the first weight.

* * * * *